US012666151B2

(12) United States Patent   (10) Patent No.:  US 12,666,151 B2

Hu   (45) Date of Patent:  Jun. 23, 2026

(54) METHOD AND DEVICE FOR ADJUSTING PID CONTROL PARAMETERS IN ANTI-SHAKE SYSTEM, CAMERA DEVICE AND STORAGE MEDIUM

(71) Applicant: AAC Acoustic Technologies (Shanghai) Co., Ltd., Shanghai (CN)

(72) Inventor: Bang Hu, Shanghai (CN)

(73) Assignee: AAC Acoustic Technologies (Shanghai) Co., Ltd., Shanghai (CN)

( * ) Notice: Subject to any disclaimer, the term of this patent is extended or adjusted under 35 U.S.C. 154(b) by 44 days.

(21) Appl. No.: 18/780,395

(22) Filed: Jul. 22, 2024

(65) Prior Publication Data

US 2025/0301222 A1     Sep. 25, 2025

Related U.S. Application Data

(63) Continuation of application No. PCT/CN2024/083057, filed on Mar. 21, 2024.

(51) Int. Cl.
H04N 23/68         (2023.01)

(52) U.S. Cl.
CPC ....... H04N 23/687 (2023.01); H04N 23/6812 (2023.01)

(58) Field of Classification Search
None
See application file for complete search history.

(56) References Cited

U.S. PATENT DOCUMENTS

| | | | | |
|---|---|---|---|---|
| 2008/0195236 A1* | 8/2008 | Koo | ..................... | G05B 21/02 |
| | | | | 700/42 |
| 2015/0181122 A1* | 6/2015 | Kang | ................... | H04N 23/687 |
| | | | | 348/208.1 |
| 2015/0195458 A1* | 7/2015 | Nakayama | ......... | H04N 23/6812 |
| | | | | 348/208.11 |
| 2023/0090592 A1* | 3/2023 | Shibata | .............. | H04N 23/6812 |
| | | | | 348/208.2 |

FOREIGN PATENT DOCUMENTS

| | | | | | |
|---|---|---|---|---|---|
| GB | 2481027 A | * | 12/2011 | ............... | G06T 7/33 |
| KR | 20170069060 A | * | 6/2017 | ............. | H04N 25/61 |

* cited by examiner

*Primary Examiner* — Paul M Berardesca

(74) *Attorney, Agent, or Firm* — Wiersch Law Group

(57) ABSTRACT

Disclosed are a method and a device for adjusting PID control parameters in an anti-shake system, a camera device and a storage medium. The method includes: determining a shake state of a camera device according to an angular velocity of an actuator in the anti-shake system in a preset period corresponding to a time acquisition point. The actuator is configured to adjust positions of the optical elements in the camera device to offset the shake of the camera device; determining target PID control parameters to drive the actuator to perform anti-shake compensation on the camera device through the target PID control parameters according to the shake state. The corresponding target PID control parameters are determined through the specific shake state, so that the PID control parameters change according to the shake state to be suitable for different anti-shake scenarios, which improves the flexibility and adaptability of the anti-shake system.

8 Claims, 7 Drawing Sheets

Determining a maximum angle of the actuator in preset period according to angular velocity of the actuator in the anti-shake system corresponding to time acquisition point — 401

Determining the shake state of the camera device according to the maximum angle — 402

Determining a shake state of a camera device according to an angular velocity of an actuator in the anti-shake system in a preset period corresponding to a time acquisition point —— 101

Determining target PID control parameters according to the shake state —— 102

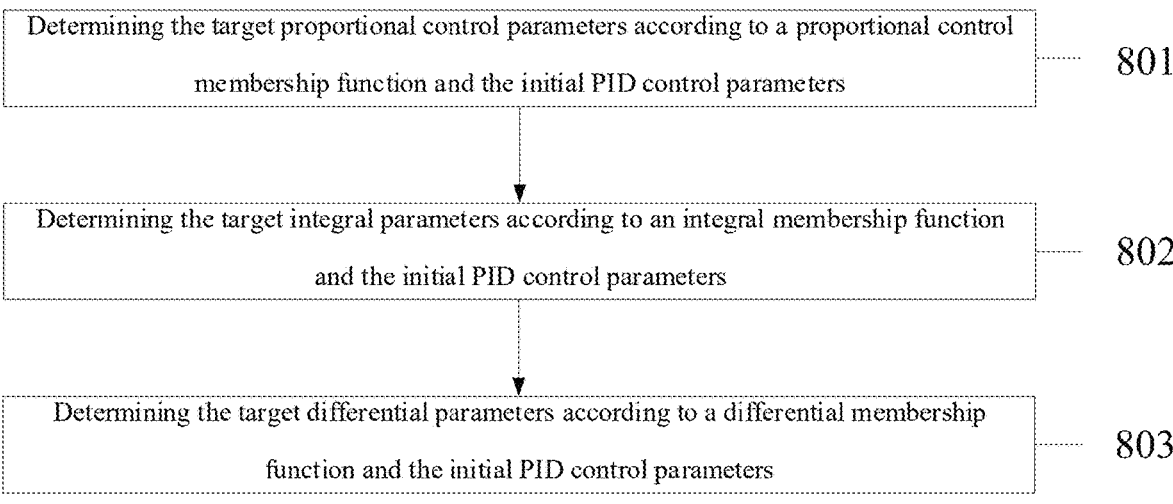

Determining the target proportional control parameters according to a proportional control membership function and the initial PID control parameters ---- 801

Determining the target integral parameters according to an integral membership function and the initial PID control parameters ---- 802

Determining the target differential parameters according to a differential membership function and the initial PID control parameters ---- 803

FIG. 8

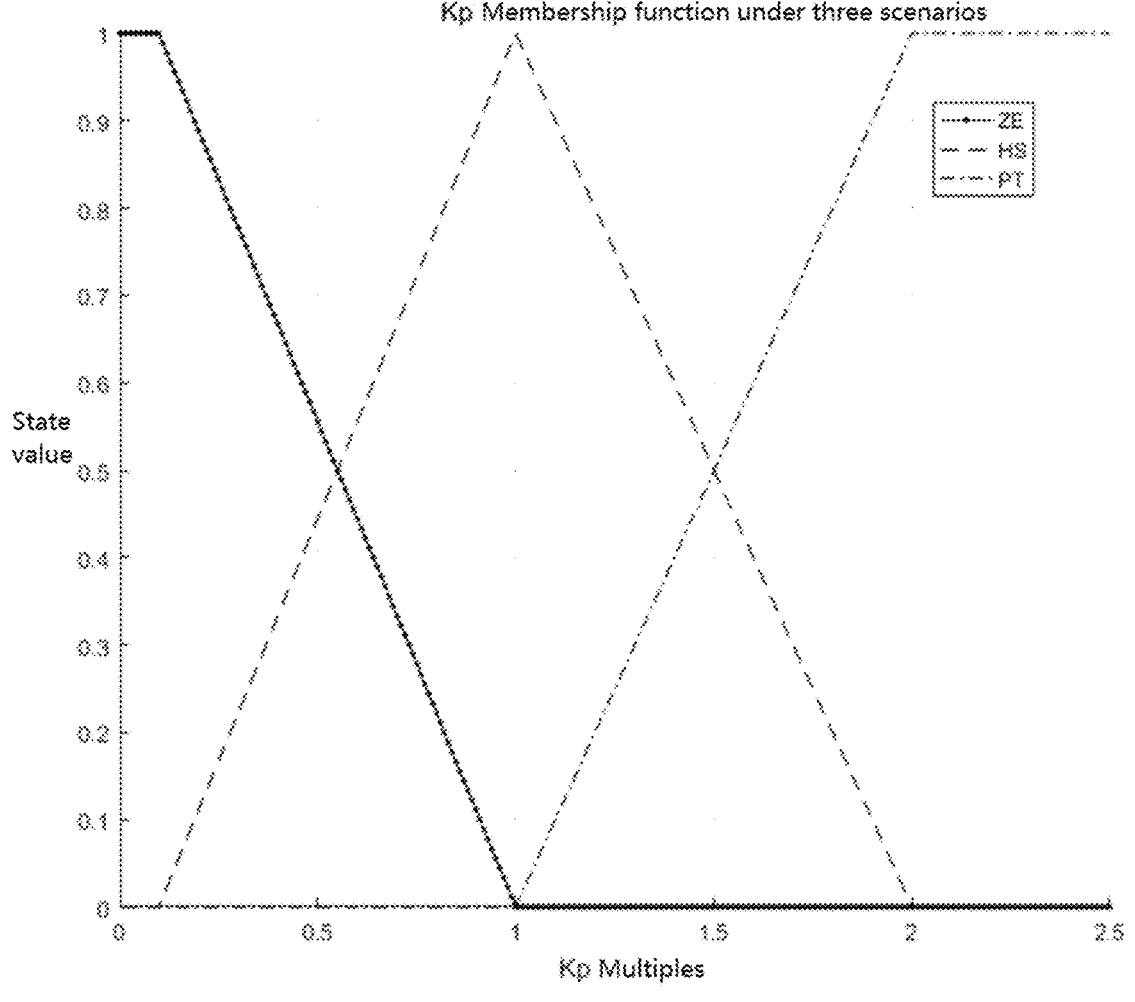

FIG. 9

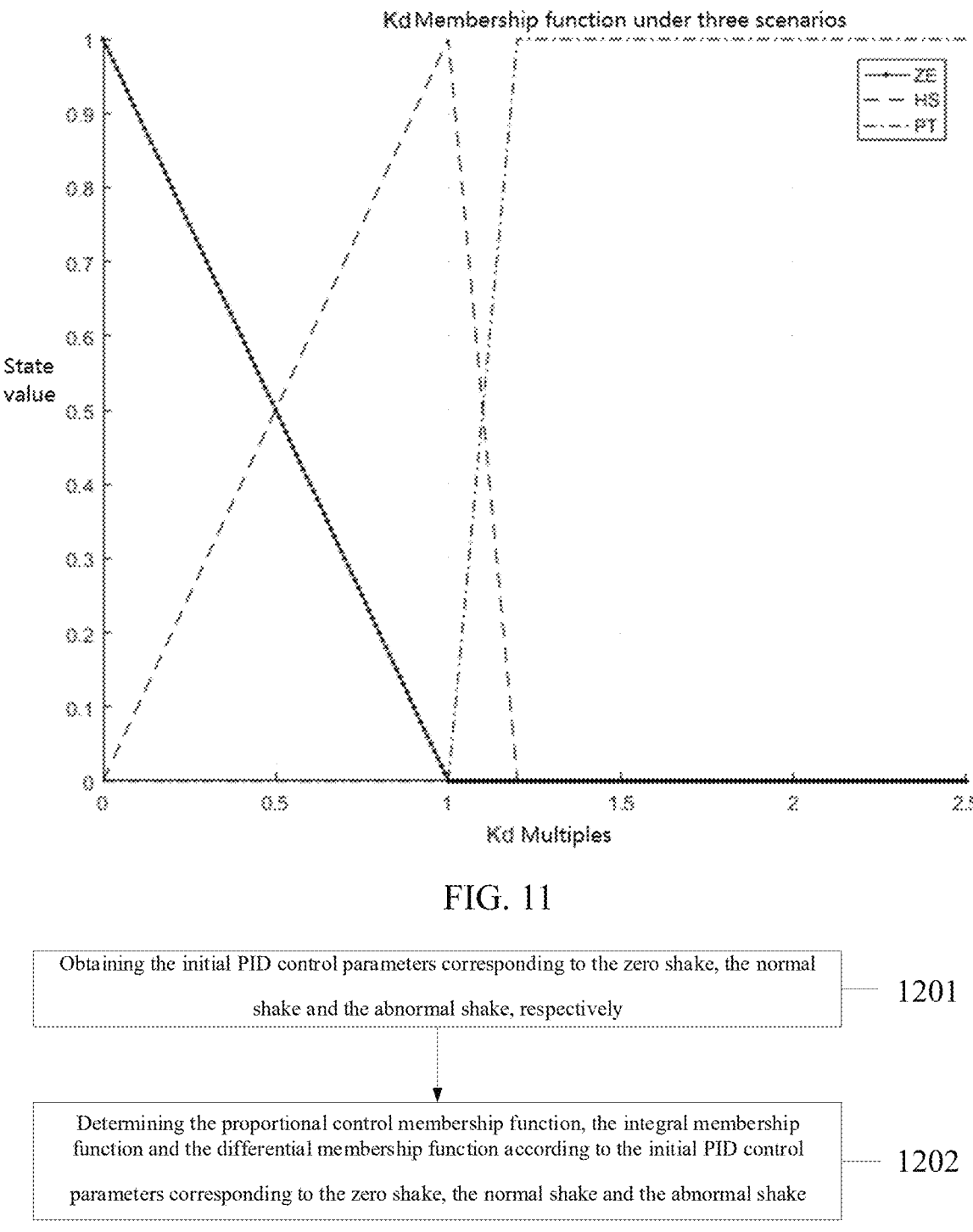

FIG. 11

Obtaining the initial PID control parameters corresponding to the zero shake, the normal shake and the abnormal shake, respectively — 1201

Determining the proportional control membership function, the integral membership function and the differential membership function according to the initial PID control parameters corresponding to the zero shake, the normal shake and the abnormal shake — 1202

FIG. 12

METHOD AND DEVICE FOR ADJUSTING PID CONTROL PARAMETERS IN ANTI-SHAKE SYSTEM, CAMERA DEVICE AND STORAGE MEDIUM

TECHNICAL FIELD

The present disclosure relates to the field of optical image stabilization and, in particular, to a method and a device for adjusting PID control parameters in an anti-shake system, a camera device and a storage medium.

BACKGROUND

With the rapid development of science and technology and the continuous innovation of various industries, the importance of optical image stabilizer (OIS) technology in photography and visual applications has become increasingly prominent. By introducing a control system into the optical system, the OIS technology effectively reduces image shake caused by vibration of the camera device, handheld photography or other motions, and thus improving image quality and user experience.

In the conventional anti-shake system, it is usually necessary to continuously correct the position adjustment of the optical elements through proportion integration differentiation (PID) control parameters to achieve the anti-shake effect. The PID control parameters in the related art is a fixed value, and the PID control parameters cannot be adjusted or changed, which is difficult to meet requirements of different anti-shake scenarios.

SUMMARY

The object of the present disclosure is to provide a method and a device for adjusting PID control parameters in an anti-shake system, a camera device and a storage medium, so that the PID control parameters may be changed according to a shake state to meet compensation requirements of different anti-shake scenarios.

To solve the above technical problem, embodiments of the present disclosure provides a method for adjusting PID control parameters in an anti-shake system, including: determining a shake state of a camera device according to an angular velocity of an actuator in the anti-shake system in a preset period corresponding to a time acquisition point. The actuator is configured to adjust positions of optical elements in the camera device to offset the shake of the camera device; and determining target PID control parameters to drive the actuator to perform anti-shake compensation on the camera device through the target PID control parameters according to the shake state.

As an improvement, the determining the shake state of the camera device according to the angular velocity of the actuator in the anti-shake system in the preset period corresponding to the time acquisition point, including: determining a maximum angle of the actuator in the preset period according to the angular velocity of the actuator in the anti-shake system in the preset period corresponding to the time acquisition point; and determining the shake state of the camera device according to the maximum angle.

As an improvement, the determining target PID control parameters according to the shake state, including: determining initial PID control parameters corresponding to the shake state; and determining the target PID control parameters according to the initial PID control parameters.

As an improvement, determining the target PID control parameters according to the initial PID control parameters, including: using the initial PID control parameters as the target PID control parameters.

As an improvement, determining the target PID control parameters according to the initial PID control parameters, including: defuzzifying the initial PID control parameters to obtain the target PID control parameters.

As an improvement, the target PID control parameters includes: a target proportional control parameter, a target integral parameter, and a target differential parameter. The defuzzifying the initial PID control parameters to obtain the target PID control parameter, including: determining the target proportional control parameters according to a proportional control membership function and the initial PID control parameters; determining the target integral parameters according to an integral membership function and the initial PID control parameters; and determining the target differential parameters according to a differential membership function and the initial PID control parameters.

As an improvement, the shake state is one of zero shake, normal shake, and abnormal shake. Prior to the determining the target PID control parameters according to the initial PID control parameters, the method further including: obtaining the initial PID control parameters corresponding to the zero shake, the normal shake and the abnormal shake, respectively; and determining the proportional control membership function, the integral membership function and the differential membership function according to the initial PID control parameters corresponding to the zero shake, the normal shake and the abnormal shake.

Embodiments of the present disclosure further provide a device for adjusting PID control parameters in an anti-shake system, including: a first determining module configured to determine a shake state of a camera device according to an angular velocity of an actuator in the anti-shake system in a preset period corresponding to a time acquisition point. The actuator is configured to adjust positions of optical elements in the camera device to offset the shake of the camera device; and a second determining module configured to determine target PID control parameters to drive the actuator to perform anti-shake compensation on the camera device through the target PID control parameters according to the shake state.

Embodiments of the present disclosure further provide a camera device, including: at least one processor; and a memory communicatively connected to the at least one processor, the memory stores instructions executable by the at least one processor, and the instructions are executed by the at least one processor to enable the at least one processor to perform the method for adjusting PID control parameters in an anti-shake system as described above.

Embodiments of the present disclosure further provide a non-transitory computer-readable storage medium storing a computer program, the computer program implements the method for adjusting PID control parameters in an anti-shake system as described above when executed by a processor.

The present disclosure provides method, device, camera device and storage medium for adjusting PID control parameters in an anti-shake system, a shake state of a camera device is determined according to the angular velocity of an actuator in the anti-shake system in a preset period corresponding to time acquisition points. The actuator is configured to adjust the position of the optical elements in the camera device to offset the shake of the camera device. A target PID control parameters is determined to drive the actuator to perform anti-shake compensation on the camera device through the target PID control parameters according to the shake state. The present disclosure determines the corresponding target PID control parameters through the specific shake state, so that the PID control parameters change according to the shake state to be suitable for different anti-shake scenarios, which may improve the flexibility and adaptability of the anti-shake system.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

FIG. 8 is a flowchart of a method for adjusting PID control parameters in an anti-shake system according to yet still another embodiment of the present disclosure;

FIG. 9 is a schematic diagram of a proportional control membership function according to an embodiment of the present disclosure;

FIG. 11 is a schematic diagram of a differential membership function according to an embodiment of the present disclosure;

FIG. 12 is a flowchart of a method for adjusting PID control parameters in an anti-shake system according to yet still another embodiment of the present disclosure;

DESCRIPTION OF EMBODIMENTS

In order to more clearly illustrate objectives, technical solutions, and advantages of embodiments of the present disclosure, the technical solutions in embodiments of the present disclosure are clearly and completely described in details with reference to the accompanying drawings. The described embodiments are merely part of the embodiments of the present disclosure rather than all of the embodiments. All other embodiments obtained by those skilled in the art based on the embodiments of the present disclosure without paying creative efforts shall fall into the protection scope of the present disclosure. The following embodiments are divided for ease of description, and shall not constitute any limitation on specific implementations of the present disclosure, and the embodiments may be mutually incorporated by reference without contradiction.

With the rapid development of science and technology and the continuous innovation of various industries, the importance of OIS technology in photography and visual applications has become increasingly prominent. By introducing a control system into the optical system, the OIS technology effectively reduces image shake caused by vibration of the camera device, handheld photography or other motions, and thus improving image quality and user experience.

In a typical OIS system/anti-shake system, a control system usually includes a sensor, an actuator, and a feedback loop. The sensor is responsible for detecting a motion state of a camera device, the actuator performs slight adjustment on optical elements in the camera device to offset shake, and the feedback loop performs monitoring system performance and performs adjustment. These components work cooperatively, so that the OIS system may provide a more stable image in a motion scenario. The actuator may be a voice coil motor/a voice coil motor (VCM) motor. The feedback loop collects a current displacement of the actuator through a Hall device, and calculates a correct displacement that should deviate by collecting an angular velocity through a gyroscope sensor device (Gyro) of an inertial measurement unit (IMU). A compensation current that should be adopted is obtained through a Proportion-Integral-Differential control algorithm through a difference between the two displacements to drive the actuator for correction, which achieves the anti-shake effect.

PID control parameters in a PID control algorithm in the related art are always fixed values, and the PID control parameters cannot be adjusted or changed, which is difficult to meet requirements of different anti-shake scenarios. Therefore, a flexible multi-control algorithm switching mechanism is urgently needed to adapt to different anti-shake scenarios, and a mechanism capable of switching multiple sets of PID control parameters in different anti-shake scenarios is significant.

Figure 1:
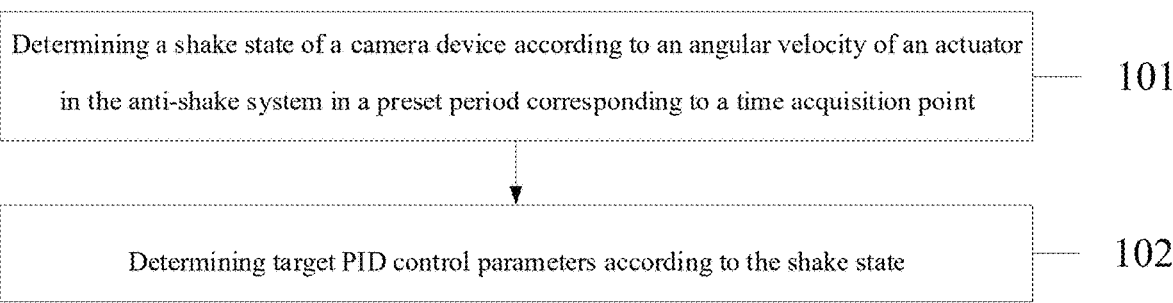
FIG. 1 is a flowchart of a method for adjusting PID control parameters in an anti-shake system according to an embodiment of the present disclosure.

Embodiments of the present disclosure relate to a method, which, as shown in FIG. 1, includes the following steps.

Step 101: a shake state of the camera device is determined according to an angular velocity of an actuator in an anti-shake system in a preset period corresponding to time acquisition points.

In the correction process of the anti-shake system, when shake occurs at the lens of the camera device, in addition to the shake that needs to be compensated under the normal condition of the user, there is also a condition that does not need to be compensated which is completely static, and there is also a scenario that needs fast return to the middle, for example, in a Pan (outside the correction capability of the actuator)/Tilt (within the correction capability of the actuator) state, so as to prevent a long waiting time when normal compensation is required.

In embodiments of the present disclosure, the shake state of the camera device includes three types: zero shake, normal shake, and abnormal shake. Zero shake indicates that the camera device is in a static state, normal shake indicates shake within the correction capability of the actuator, and abnormal shake indicates shake outside the correction capability of the actuator.

Figure 2:
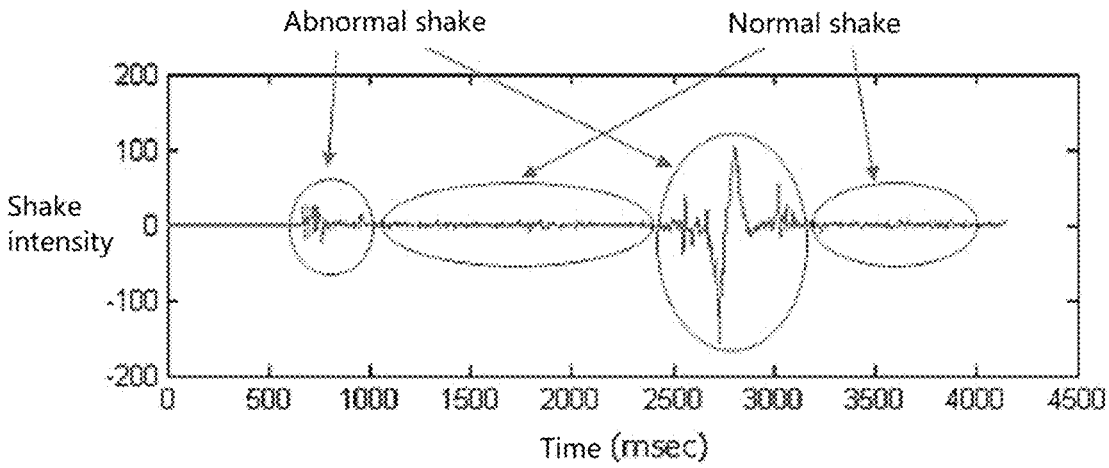
FIG. 2 is a schematic diagram of shake amplitudes in different shake states according to an embodiment of the present disclosure.

As for the shake amplitudes of the normal shake and the abnormal shake, as shown in FIG. 2, the abscissa is time, and the ordinate is shake amplitude. It may be seen that the shake amplitude of the normal shake is smaller than the shake amplitude of the abnormal shake, and OIS control needs to be performed in different manners for the two shake modes.

Figure 3:
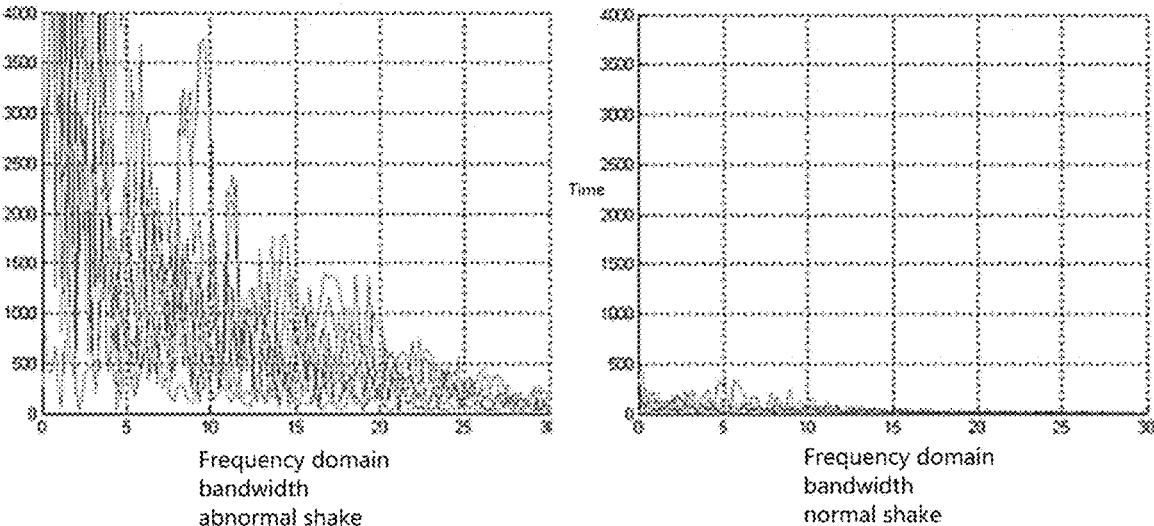
FIG. 3 is a schematic diagram of frequency domain bandwidths in different shake states according to an embodiment of the present disclosure.

Regarding the frequency domain bandwidths of normal shake and abnormal shake, as shown in FIG. 3, the abscissa is the frequency domain bandwidth, and the ordinate is time. It may be seen that the frequency domain bandwidths in these two shake modes are similar, which cannot be distinguished from the frequency domain, and can only be distinguished through the time domain.

It may be seen through experiments that the angular velocity of the actuator is relatively stable in the zero shake state, the change of amplitude of the angular velocity of the actuator in normal shake is greater than that of the angular velocity in the zero shake state, and the change of the amplitude of the angular velocity of the actuator in abnormal shake is greater than that of the angular velocity in the normal shake state.

Therefore, in the present disclosure, the shake state of the camera device may be determined according to the angular velocity of the actuator in the anti-shake system inside the camera device. It is appreciated that, it may also be determined according to other parameters, which is not specifically limited in the embodiments of the present disclosure.

If the camera device is shaking, the shake is an action change in a time period, and therefore, the angular velocity of the actuator in a time period near time acquisition points needs to be collected to determine the shake state of the camera device. The preset period may be set according to actual needs, and is not specifically limited in the embodiments of the present disclosure.

In embodiments of the present disclosure, the actuator is configured to adjust the position of optical elements in the imaging device to offset shake of the camera device.

Step 102: target PID control parameters are determined according to the shake state.

During normal shake, normal general PID control parameters are started to be used as correction of the target PID control parameters for compensation, so that the problem of fuzzy picture may be solved, but under the zero shake or abnormal shake state, the original PID control coefficient needs to be specially processed according to the shake state of the camera device. After the target PID control parameters are determined, the actuator is driven by using the target PID control parameters to perform anti-shake compensation on the camera device.

In an embodiment, when it is determined that the shake state of the camera device is zero shake, i.e., static state, it is recommended that the PID control algorithm does not work, that is, the PID control parameters may be set to zero, so that power is saved and no photographing fuzzy is caused. When it is determined that the current shake state of the camera device is the abnormal shake state, the general design goal is the position of the center line of the module, and fast return to the middle is required, so as to avoid the crust breaking of the module due to integral saturation to increase the service life of the module. When the state is switched from the abnormal shake state to the shake that needs to be normally compensated, the duration will not be too long, and the user experience is not affected. Return to the middle is used to avoid waiting for a long time when the OIS system is corrected and started next time, because when the lens of the camera device has up and down shake after returning to the center line position of the module, correction may be conveniently carried out through a PID control algorithm through the difference between the desired angle and the target angle, and the OIS system is prepared for initial starting through the return to the middle.

Embodiments of the present disclosure provide a method for adjusting PID control parameters in an anti-shake system, a shake state of a camera device is determined according to the angular velocity of an actuator in the anti-shake system in a preset period corresponding to time acquisition points. The actuator is used to adjust the position of the optical elements in the camera device to offset the shake of the camera device. A target PID control parameters is determined to drive the actuator to perform anti-shake compensation on the camera device through the target PID control parameters according to the shake state. The present disclosure determines the corresponding target PID control parameters through the specific shake state, so that the PID control parameters change according to the shake state to be suitable for different anti-shake scenarios, which may improve the flexibility and adaptability of the anti-shake system.

Figure 4:
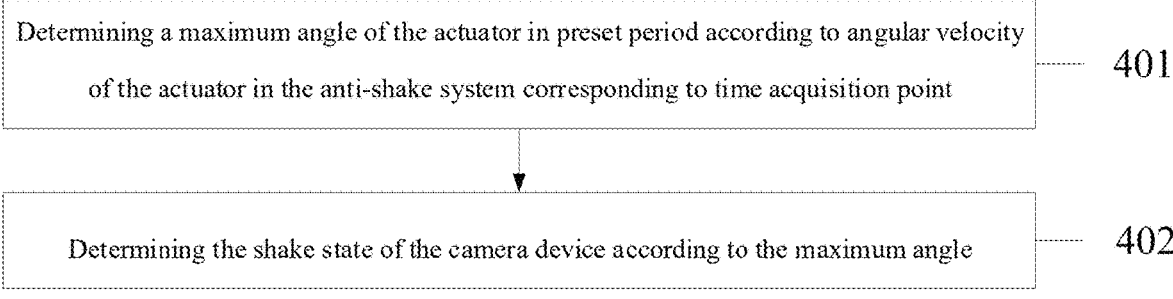
FIG. 4 is a flowchart of a method for adjusting PID control parameters in an anti-shake system according to another embodiment of the present disclosure.

Based on the method for adjusting PID control parameters in an anti-shake system shown in FIG. 1, embodiments of the present disclosure further provide a method for adjusting PID control parameters in an anti-shake system, as shown in FIG. 4, step 101: the shake state of the camera device is determined according to the angular velocity of the actuator in the anti-shake system in the preset period corresponding to the time acquisition point, which includes the following steps.

Step 401: the maximum angle of the actuator in the preset period is determined according to the angular velocity of the actuator in the anti-shake system in the preset period corresponding to the time acquisition point.

The angular velocity signal collected by the gyroscope sensor device is de-DC and integrated to obtain the angle. In order to determine the shake state of the camera device at the current moment, the shake state of the camera device may be determined by selecting the time acquisition point corresponding to the maximum angle of the actuator in the preset period.

Figure 5:
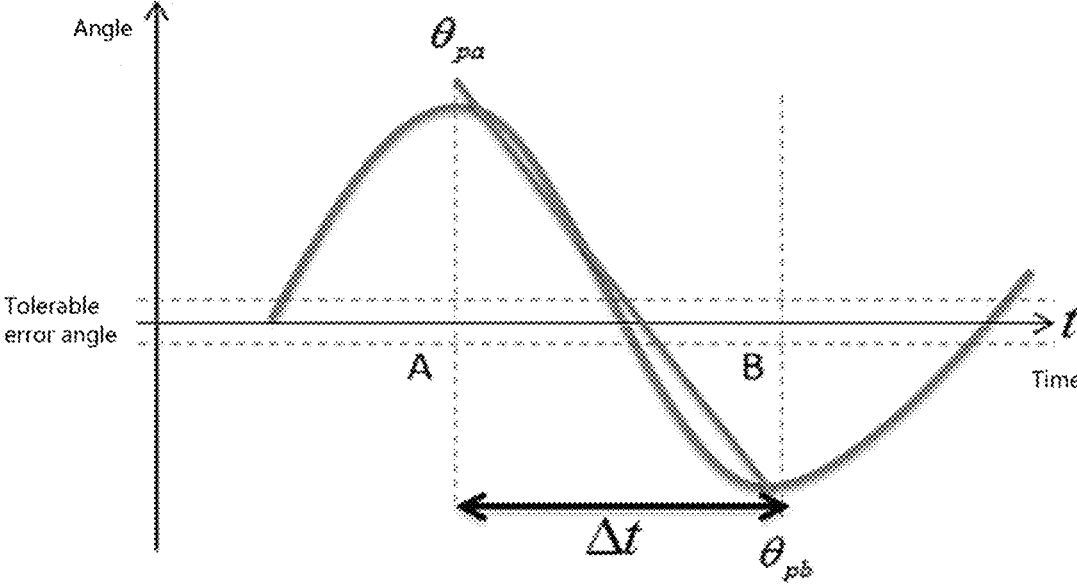
FIG. 5 is a schematic diagram of a maximum angle within a preset period according to an embodiment of the present disclosure.

As shown in FIG. 5, the abscissa is time, and the ordinate is angle (unit: degrees), $\Delta_t$ is the present time, and a maximum angle $\theta_p$ within the preset period is $\theta_{pa}$ The tolerable error is calculated according to the angle difference multiplied by the focal length, and at present, the tolerable error in the normal state in the field is about $+/-2\sim3$ um, and the tolerable error angle may be obtained by dividing by the general focal length.

In an embodiment, the time acquisition point is usually the current time point.

For example, according to the angular velocity of the actuator in the anti-shake system in the preset period corresponding to the time acquisition point, the timing information of the angle $\theta$ is obtained after the angular velocity is preprocessed (including de-DC, filtration and integration), and the angle $\theta$ is subjected to low-pass filtering (such as the first-order IIR filter, the purpose is to eliminate the influence of noise interference). As shown in FIG. 5, the maximum angle of the angle $\theta$ in the preset period is obtained according to the following method.

If the angle $\theta(n)$ of the time acquisition point n1 within the preset period satisfies $\theta(n1) \geq \theta(n1-1)$ and $\theta(n1) \geq \theta(n1+1)$, the maximum angle $\theta_{pa}$=max((n1),0.05); and if the time acquisition point does not exist, the maximum angle $\theta_{pa}$=0.05, which is the preset maximum initial value. If the angle $\theta$(n2) of the time acquisition point n2 within the preset period satisfies $\theta$(n2)≤(n2−1) and $\theta$(n2)≥$\theta$(n2+1), the maximum angle $\theta_{pb}$=min($\theta$(n),−0.05); and if the time acquisition point does not exist, the maximum angle $\theta_{pb}$=−0.05, which is the preset minimum initial value. At this time, the maximum angle $\theta_p$=max($|\theta_{pa}|,|\theta_{pb}|$).

Step 402: the shake state of the camera device is determined according to the maximum angle.

The shake state corresponding to the maximum angle is determined as the shake state of the camera device according to the correspondence between angles and shake states.

For example, if it is known that the angle that the VCM motor may correct is ±0.8 degrees, the correspondence between the angle and the shake state may be preset. For example, when the absolute value of the angle is less than 0.05 degrees, the corresponding shake state is zero shake, the absolute value of the angle is within 0.05 to 0.8 degrees, the corresponding shake state is normal shake, and when the absolute value of the angle is greater than 0.8 degrees, the corresponding shake state is abnormal shake.

Figure 6:
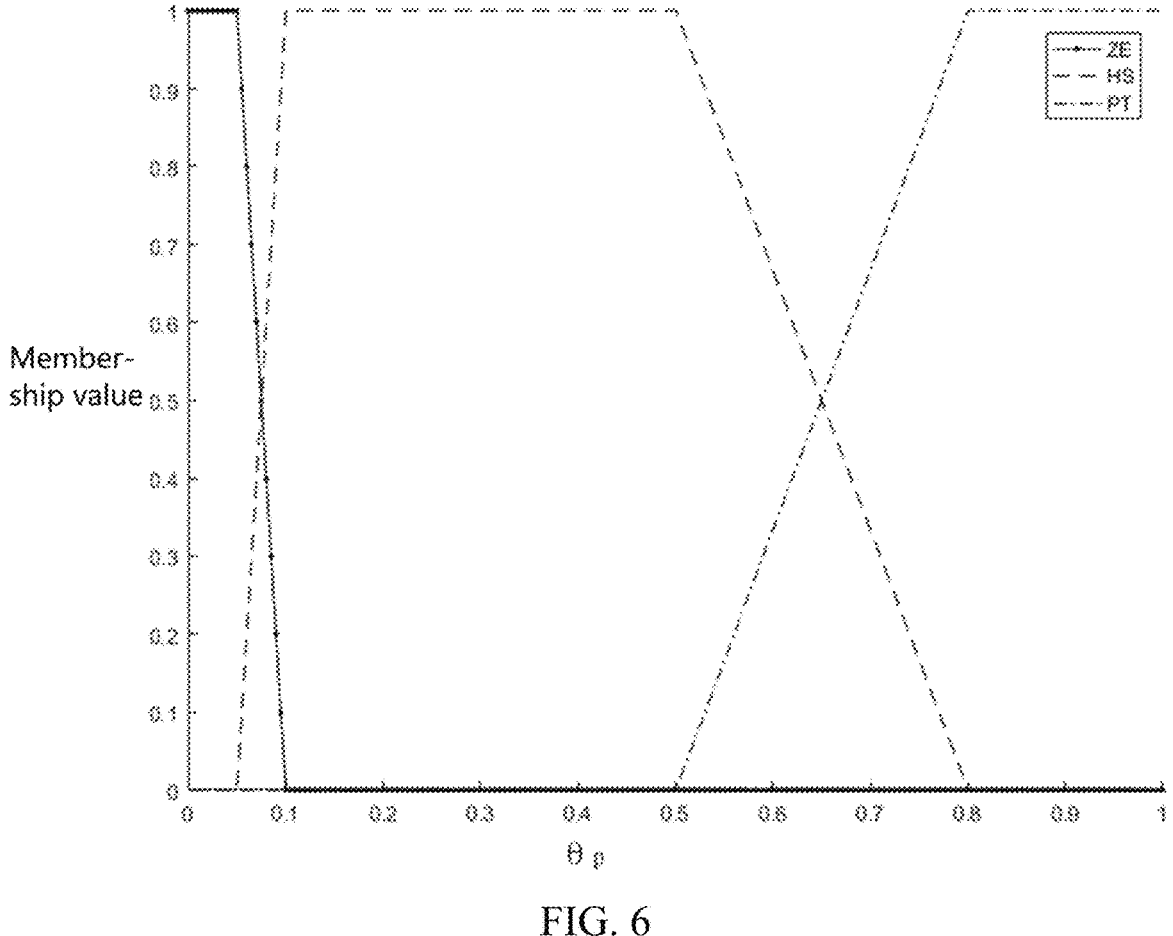
FIG. 6 is a schematic diagram of a relationship between a membership value and a maximum angle according to an embodiment of the present disclosure.

In some embodiments, after the maximum angle is obtained, three membership states/membership values in the three shake states may be obtained according to the maximum angle, and then the shake state of the camera device may be determined according to the three membership states/membership values. As shown in FIG. 6, it is a correspondence between three membership states/membership values in three shake states and the maximum angle $\theta_p$, ZE is zero shake, HS is normal shake, and PT is abnormal shake.

According to the method for adjusting PID control parameters in an anti-shake system provided by the embodiments of the disclosure, the maximum angle of the actuator within the preset period is determined according to the angular velocity of the actuator in the anti-shake system within the preset period corresponding to the time acquisition points, and the shake state of the camera device may be determined according to the maximum angle.

Figure 7:
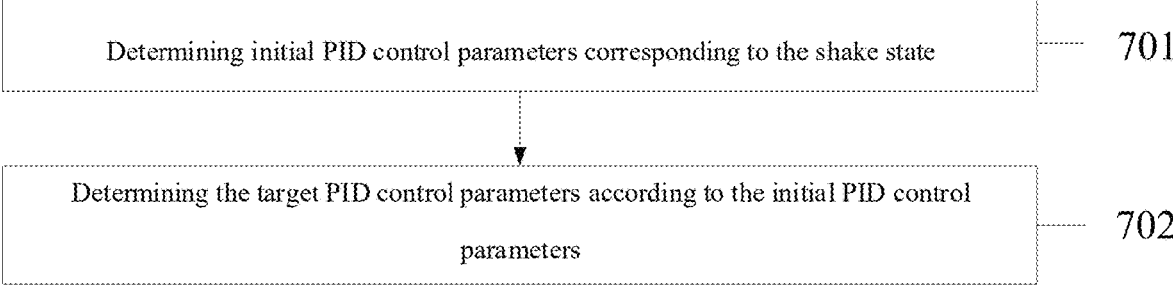
FIG. 7 is a flowchart of a method for adjusting PID control parameters in an anti-shake system according to still another embodiment of the present disclosure.

Based on the method for adjusting PID control parameters in an anti-shake system shown in FIG. 1, embodiments of the present disclosure further provide a method for adjusting PID control parameters in an anti-shake system, for example, as shown in FIG. 7, step 102: target PID control parameters are determined according to the shake state, which includes the following steps.

Step 701: initial PID control parameters corresponding to the shake state are determined.

The three coefficients $K_p$, $K_i$, $K_d$ in the PID control algorithm have respective functions, which may correspond to different control scenarios as shown in the following table.

| Closed-Loop Response | Rise time | Overshoot | Stabilization Time | Steady State Error |
|---|---|---|---|---|
| When $K_p$ increase | Reduce | Increase | Slight change | Reduce |
| When $K_i$ increase | Reduce | Increase | Increase | Remove |
| When $K_d$ increase | Reduce | Reduce | Slight change | Slight change |

The initial PID control parameters may include: an initial proportional control parameter, an initial integral parameter, and an initial differential parameter.

For zero shake states, i.e., static signals, the signal changes very slowly. For the proportional (P), due to the slow change of the static signal, it is usually not necessary to have a large proportional gain. The smaller P value may ensure that the system is not too sensitive to the response of the signal change. Therefore, the initial proportional control parameters in the initial PID control parameters may be 0.1*$K_p$ (small value), $K_p$ is reference value of the proportional control parameter. For integral (I): The average value of the static signal may have steady state error. A moderate increase in the integral term (I) may help the system gradually eliminate these errors and make the system better track the static reference value. Therefore, the initial integral parameters in the initial PID control parameters may be 2*$K_i$ (greater), $K_i$ is the reference value of the integral parameter. For differential (D): Because the static signal changes slowly, the effect of the differential term (D) is relatively small. In many static scenarios, the differential term may be ignored, or a smaller value may be selected to avoid adverse effects on the stability of the system. Therefore, the initial differential parameters in the initial PID control parameters may be 0.

For normal shake, that is, a common hand shaking signal, normal compensation is usually required. For the proportional (P), normal compensation is usually required for the hand shaking signal. In order to quickly respond to signal changes, a proportional gain (P) needs to be increased, and a greater value of P may improve the sensitivity of the system to signal changes. Therefore, an initial proportional control parameters in the initial PID control parameters may be 1*$K_p$ (normal value). For the integral (I), the average value of the hand shaking signal is often relatively small, so the effect of the integral term (I) is relatively small. The smaller I value may ensure that the system is not sensitive to the change of the average value of the signal and avoid excessive adjustment. Therefore, the initial integral parameters in the initial PID control parameters may be 1*$K_i$ (normal value). For the differential (D), the change rate of the hand shaking signal at the extreme point is the largest, so a moderate increase in the differential gain (D) helps to suppress the oscillation at the extreme point. Therefore, the initial differential parameters in the initial PID control parameters may be 1*$K_d$ (normal value), $K_d$ is the reference value of the differential parameter.

In embodiments of the present disclosure, the reference value of the proportional control parameter, the reference value of the integral parameter, and the reference value of the differential parameters are all preset values, and the three preset reference values may be determined by a response equation of a VCM motor in the OIS system, a gain margin and a phase margin required by an entire loop.

For abnormal shake, return to the middle is required, and a target similar to a step signal is given. The return to the middle is a step signal requirement, the return time is required to be as short as possible, and the return oscillation is required to be as small as possible, and these two targets may be adjusted to be optimal through PID parameters. For the proportional (P). For the step signal, it is required to quickly respond to the change of the signal, and a larger proportional gain (P) may accelerate the response of the system and reduce overshoot, so the initial proportional control parameters in the initial PID control parameters may be 2*$K_d$(greater). For integral (I). There may be overshoot in the return of the step signal, and the integral term (I) needs to be moderately reduced to alleviate the impact of the overshoot of this process on the device. Therefore, the initial integral parameters in the initial PID control parameters may be $0.8*K_i$ (slightly smaller). For the differential (D), a moderate increase in the differential gain (D) may help prevent overshoot and improve the stability of the system. Therefore, the initial differential parameters in the initial PID control parameters may be $1.2*K_d$ (slightly larger). Understandably, the specific values of the above initial proportional control parameter, initial integral parameter, and initial differential parameters are all examples, and no specific limitations are made in the embodiments of the present disclosure.

Step 702: the target PID control parameters is determined according to the initial PID control parameter.

In an embodiment, the initial PID control parameters may be used as a target PID control parameter, and the actuator is driven by using the target PID control parameters to perform anti-shake compensation on the camera device.

In another embodiment, when the shake state is switched, the initial PID control parameters is also switched, and the smooth transition needs to be considered, that is, when the state is switched from abnormal shake to normal shake, whether the PID transition is smooth or not and whether the regulation and control of the switching process are relatively friendly, so that it is necessary to propose a multi-PID switching scheme to improve the stability and user friendliness of the OIS product, so as to improve the product competitiveness. For example, the initial PID control parameters may be defuzzified to obtain the target PID control parameter. The defuzzify method may be a maximum membership method, a weighted average method, a median method, etc.

The initial PID control parameters corresponding to the shake state is determined according to the PID control parameters adjustment method in the anti-shake system provided by the embodiments of the present disclosure, and then the target PID control parameters may be determined according to the initial PID control parameters.

Based on the method for adjusting PID control parameters in an anti-shake system shown in FIG. 7, embodiments of the present disclosure further provides a method for adjusting PID control parameters in an anti-shake system, for example, as shown in FIG. 8, the target PID control parameters includes: The target proportional control parameter, the target integral parameter, and the initial PID control parameters is defuzzified to obtain the target PID control parameter, which includes the following steps.

Step 801: the target proportional control parameters is determined according to a proportional control membership function and the initial PID control parameters.

FIG. 9 is a schematic diagram of the proportional control membership function provided by the embodiments of the present disclosure. As shown in FIG. 9, when the state is switched from zero shake to normal shake, if the calculated zero shake (ZE) is 0.3 and the normal shake (HS) is 0.7, the membership curve of ZE is intercepted with the horizontal line of y=0.3 to obtain the trapezoid below, and the membership curve of HS is intercepted with the horizontal line of y=0.7 to obtain the trapezoid below. For the collection area of the two trapezoids, the abscissa of the center of gravity is obtained by integrating the center of gravity, which is a value between some [0.1,1]. Multiplying it by $K_p$ is the target proportional control parameter, because the use of the barycentric abscissa may achieve the purpose of smooth transition.

Step 802: the target integral parameters is determined according to an integral membership function and the initial PID control parameters.

Figure 10:
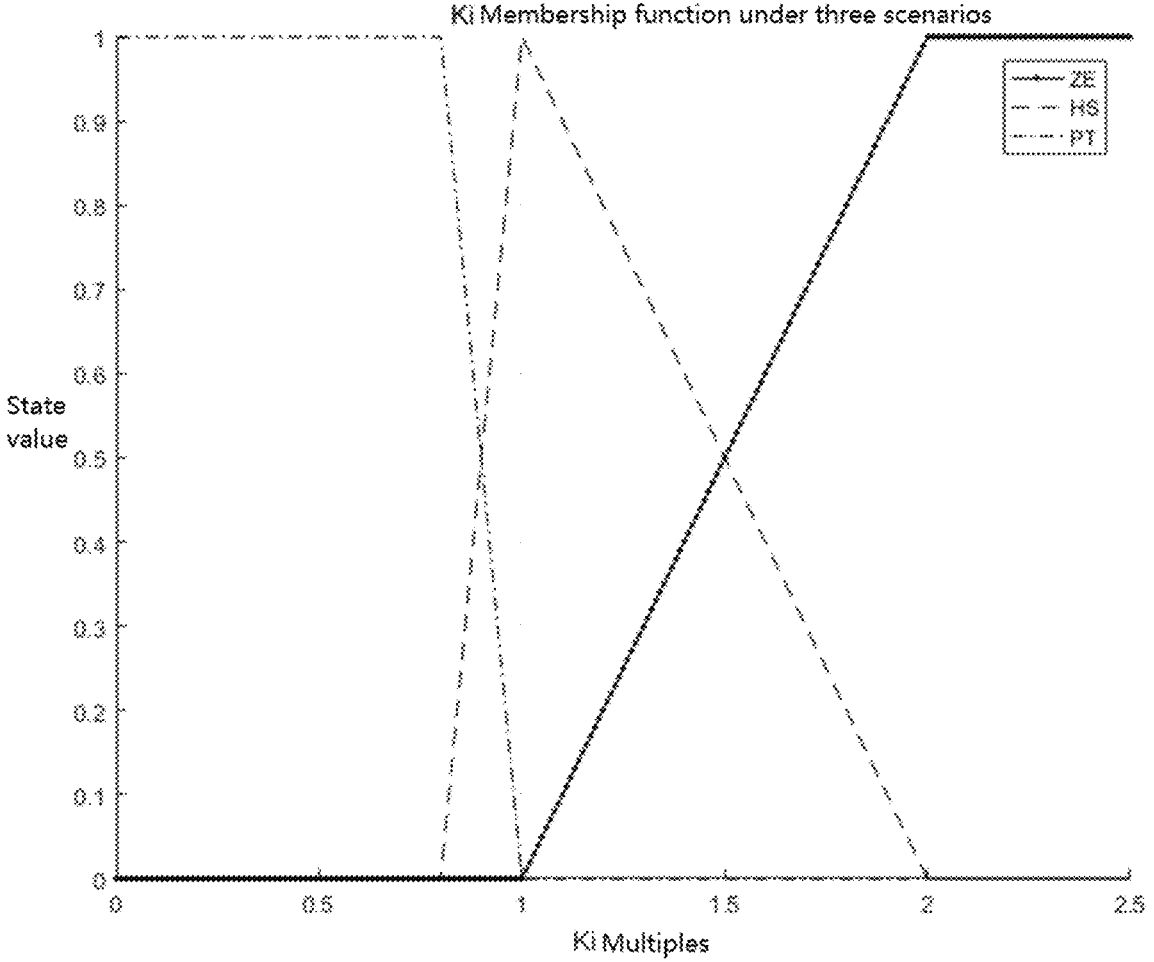
FIG. 10 is a schematic diagram of an integral membership function according to an embodiment of the present disclosure.

FIG. 10 is a schematic diagram of the integral membership function provided by the embodiments of the present disclosure. As shown in FIG. 10, when the state is switched from zero shake to normal shake, if the calculated ZE is 0.3 and the HS is 0.7, the membership curve of ZE is intercepted with the horizontal line of y=0.3 to obtain the trapezoid below, and the membership curve of HS is intercepted with the horizontal line of y=0.7 to obtain the trapezoid below. For the collection area of the two trapezoids, the abscissa of the center of gravity is obtained by integrating the center of gravity, which is a reasonable value. Multiplying it by $K_i$ is the target integral control parameter, because the use of the barycentric abscissa may achieve the purpose of smooth transition.

Step 803: the target differential parameters is determined according to a differential membership function and the initial PID control parameters.

FIG. 11 is a schematic diagram of the differential membership function provided by the embodiments of the present disclosure. As shown in FIG. 11, when the state is switched from zero shake to normal shake, if the calculated ZE is 0.3 and the HS is 0.7, the membership curve of ZE is intercepted with the horizontal line of y=0.3 to obtain the trapezoid below, and the membership curve of HS is intercepted with the horizontal line of y=0.7 to obtain the trapezoid below. For the collection area of the two trapezoids, the abscissa of the center of gravity is obtained by integrating the center of gravity, which is a value between [0,1]. Multiplying it by $K_d$ is the target differential control parameter, because the use of the barycentric abscissa may achieve the purpose of smooth transition.

An execution sequence of step 801, step 802, and step 803 is not specifically limited.

Embodiments of the present disclosure further provide a method for adjusting PID control parameters in an anti-shake system, the target PID control parameters includes: the target proportional control parameter, the target integral parameters and the target differential parameters. The target proportional control parameters may be determined according to the proportional control membership function and the initial PID control parameters. The target integral parameters may be determined according to the integral membership function and the initial PID control parameters. The target differential parameters may be determined according to the differential membership function and the initial PID control parameters. By defuzzifying the parameters, the smooth transition of the target PID control parameters under different scenario switching may be realized, so that the control output becomes smoother and a better user experience may be obtained.

Based on the method for adjusting PID control parameters in an anti-shake system shown in FIG. 8, embodiments of the present disclosure further provides a method for adjusting PID control parameters in an anti-shake system, for example, the shake state of the camera device determined in step 101 is one of zero shake, normal shake, and abnormal shake. As shown in FIG. 12, and step 702: before target PID control parameters are determined according to the initial PID control parameters, the method further includes the following steps.

Step 1201: the initial PID control parameters corresponding to the zero shake, the normal shake and the abnormal shake are obtained respectively.

According to the above step 501, the initial PID control parameters corresponding to the zero shake is: $0.1*K_p$, $2*K_i$, 0, initial PID control parameters corresponding to the normal shake are: $1*K_p$, $1*K_i$, $1*K_d$, initial PID control parameters corresponding to the abnormal shake are: $2*K_p$, $1.2*K_i$, $1.2*K_d$.

Step 1202: the proportional control membership function, the integral membership function and the differential membership function are determined according to the initial PID control parameters corresponding to the zero shake, the normal shake and the abnormal shake.

The method for obtaining three membership functions according to the example in step 402 and the value in step 1201 is as follows.

For the proportional control membership function, the multiples of $K_p$ in zero shake (ZE), normal shake (HS) and abnormal shake (PT) in the initial PID control parameters are 0.1, 1 and 2, respectively, and a schematic diagram of the proportional control membership function shown in FIG. 9 may be obtained.

For the integral control membership function, the multiples of $K_i$ in zero shake (ZE), normal shake (HS) and abnormal shake (PT) in the initial PID control parameters are 2, 1 and 1.2, respectively, and a schematic diagram of the integral control membership function shown in FIG. 10 may be obtained.

For the differential control membership function, the multiples of $K_d$ in zero shake (ZE), normal shake (HS) and abnormal shake (PT) in the initial PID control parameters are 0, 1 and 1.2, respectively, and a schematic diagram of the differential control membership function shown in FIG. 11 may be obtained.

Embodiments of the present disclosure provide a method for adjusting PID control parameters method in an anti-shake system, which obtains the initial PID control parameters corresponding to zero shake, normal shake and abnormal shake, respectively. The proportional control membership function, integral membership function and differential membership function are determined according to the initial PID control parameters corresponding to zero shake, normal shake and abnormal shake, respectively.

The steps of the above methods are divided only to describe clearly, and the implementation may be combined into one step or split into several steps, which are all within the protection of the present disclosure as long as the same logical relationship is included. Adding irrelevant modifications to the algorithm or process or introducing irrelevant designs, but not changing the core design of the algorithm and process is within the scope of protection of the present disclosure.

Figure 13:
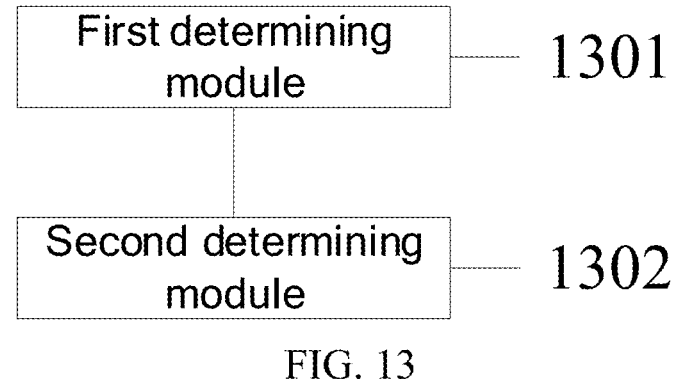
FIG. 13 is a structural schematic diagram of a device for adjusting PID control parameters in an anti-shake system according to an embodiment of the present disclosure.

Embodiments of the present disclosure relate to a device for adjusting PID control parameters in an anti-shake system, the details of the device for adjusting PID control parameters in an anti-shake system are specifically described below, the following contents are only implementation details provided for ease of understanding, and are not necessary for implementing this embodiment. FIG. 13 is a schematic diagram of a device for adjusting PID control parameters in an anti-shake system of the present embodiment, and as shown in FIG. 13, the device includes: a first determining module 1301 and a second determining module 1302.

The first determining module 1301 is configured to determine a shake state of a camera device according to the angular velocity of an actuator in an anti-shake system in a preset period corresponding to time acquisition points. The actuator is used to adjust the position of optical elements in the camera device to offset the shake of the camera device.

The second determining module 1302 is configured to determine target PID control parameters to drive the actuator to perform anti-shake compensation on the camera device through the target PID control parameters according to the shake state.

In some embodiments, in the first determining module 1301, the maximum angle of the actuator within the preset period is determined according to the angular velocity of the actuator in the anti-shake system within the preset period corresponding to the time acquisition points; and the shake state of the camera device is determined according to the maximum angle.

In some embodiments, in the second determining module 1302, the initial PID control parameters corresponding to the shake state is determined; the target PID control parameters may be determined according to the initial PID control parameters.

In some embodiments, in the second determining module 1302, the initial PID control parameters is as the target PID control parameters.

In some embodiments, in the second determining module 1302, the initial PID control parameters is defuzzified to obtain the target PID control parameters.

In some embodiments, in the second determining module 1302, the target PID control parameters includes: the target proportional control parameter, the target integral parameter, and the target differential parameter. The initial PID control parameters is defuzzified to obtain the target PID control parameter, including: the target proportional control parameters is determined according to the proportional control membership function and the initial PID control parameters; the target integral parameters is determined according to the integral membership function and the initial PID control parameters; and the target differential parameters is determined according to the differential membership function and the initial PID control parameters.

In some embodiments, the second determining module 1302 is used for one of the shake states of zero shake, normal shake, abnormal shake. Before the target PID control parameters is determined according to the initial PID control parameters, further including: the initial PID control parameters corresponding to zero shake, normal shake and abnormal shake are obtained, respectively. The proportional control membership function, integral membership function and differential membership function are determined according to the initial PID control parameters corresponding to zero shake, normal shake and abnormal shake, respectively.

Figure 14:
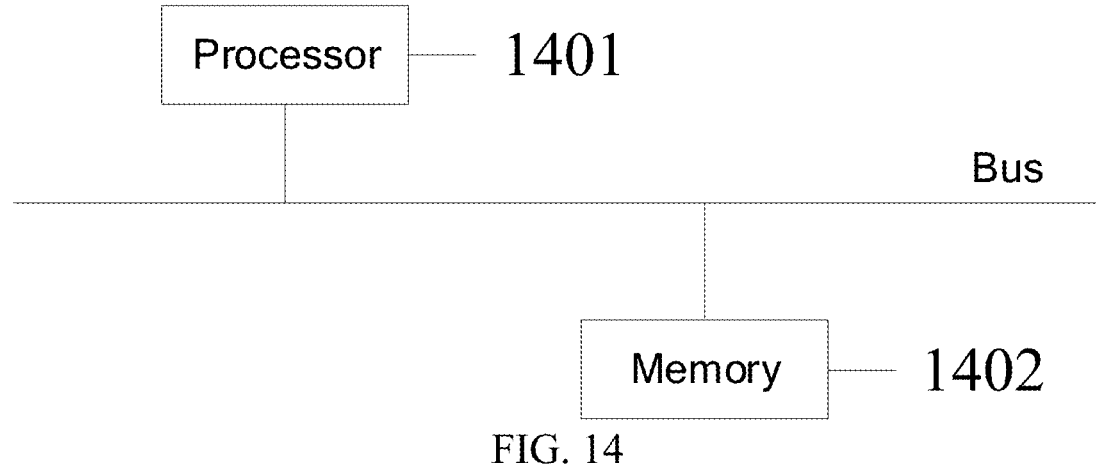
FIG. 14 is a structural schematic diagram of a camera device according to an embodiment of the present disclosure.

Embodiments of the present disclosure relates to a camera device, as shown in FIG. 14, including: at least one processor 1401; and a memory 1402 communicatively connected to the at least one processor 1401, the memory 1402 stores instructions executable by the at least one processor 1401, and the instructions are executed by the at least one processor 1401 to enable the at least one processor 1401 to perform the method for adjusting PID control parameters in an anti-shake system as described above.

The memory 1402 and the processor 1401 are connected through a bus, the bus may include any quantity of interconnected buses and bridges, and the bus connects one or more processors 1401 and various circuits of the memory 1402 together.

The processor 1401 is responsible for managing the bus and general processing, and may further provide various functions. The memory 1402 may be used to store data used by the processor 1401 when performing operations.

Embodiments of the disclosure relate to a non-transitory computer-readable storage medium which stores a computer program. When the computer program is executed by the processor, the methods in the above embodiments are implemented.

That is, those skilled in the art may understand that all or part of the steps in implementing the method in the above embodiments may be implemented by using a program to instruct related hardware, and the program is stored in a storage medium, and includes several instructions used to enable a device (which may be a single-chip microcomputer, a chip, etc.) or a processor to perform all or part of the steps in the methods in the embodiments of the present disclosure. The above storage medium includes: USB flash drive, mobile hard disk, Read-Only Memory (ROM), Random Access Memory (RAM), a magnetic disk or a compact disk, and other media that can store program code.

Those skilled in the art may understand that the above embodiments are specific embodiments for implementing the present disclosure, and in practical applications, various changes may be made in form and detail without departing from the spirit and scope of the present disclosure.

What is claimed is:

1. A method for adjusting proportion-integration-differentiation (PID) control parameters in an anti-shake system, comprising:

determining a shake state of a camera device according to an angular velocity of an actuator in the anti-shake system in a preset period corresponding to a time acquisition point, wherein the actuator is configured to adjust positions of optical elements in the camera device to offset the shake of the camera device; and determining target PID control parameters to drive the actuator to perform anti-shake compensation on the camera device through the target PID control parameters according to the shake state, wherein the determining the shake state of the camera device according to the angular velocity of the actuator in the anti-shake system in the preset period corresponding to the time acquisition point, comprising:

determining a maximum angle of the actuator in the preset period according to the angular velocity of the actuator in the anti-shake system in the preset period corresponding to the time acquisition point; and determining the shake state of the camera device according to the maximum angle.

2. The method for adjusting PID control parameters in an anti-shake system as described in claim 1, wherein the determining target PID control parameters according to the shake state, comprising:

determining initial PID control parameters corresponding to the shake state; and determining the target PID control parameters according to the initial PID control parameters.

3. The method for adjusting PID control parameters in an anti-shake system as described in claim 2, wherein determining the target PID control parameters according to the initial PID control parameters, comprising:

using the initial PID control parameters as the target PID control parameters.

4. The method for adjusting PID control parameters in an anti-shake system as described in claim 2, wherein determining the target PID control parameters according to the initial PID control parameters, comprising:

defuzzifying the initial PID control parameters to obtain the target PID control parameters.

5. The method for adjusting PID control parameters in an anti-shake system as described in claim 4, wherein the target PID control parameters comprises: a target proportional control parameter, a target integral parameter, and a target differential parameter;

the defuzzifying the initial PID control parameters to obtain the target PID control parameter, comprising:

determining the target proportional control parameters according to a proportional control membership function and the initial PID control parameters;

determining the target integral parameters according to an integral membership function and the initial PID control parameters; and determining the target differential parameters according to a differential membership function and the initial PID control parameters.

6. The method for adjusting PID control parameters in an anti-shake system as described in claim 5, wherein the shake state is one of zero shake, normal shake, and abnormal shake;

prior to the determining the target PID control parameters according to the initial PID control parameters, the method further comprising:

obtaining the initial PID control parameters corresponding to the zero shake, the normal shake and the abnormal shake, respectively; and determining the proportional control membership function, the integral membership function and the differential membership function according to the initial PID control parameters corresponding to the zero shake, the normal shake and the abnormal shake.

7. A device for adjusting proportion-integration-differentiation (PID) control parameters in an anti-shake system, comprising:

a first determining module configured to determine a shake state of a camera device according to an angular velocity of an actuator in the anti-shake system in a preset period corresponding to a time acquisition point, wherein the actuator is configured to adjust positions of optical elements in the camera device to offset the shake of the camera device; and a second determining module configured to determine target PID control parameters to drive the actuator to perform anti-shake compensation on the camera device through the target PID control parameters according to the shake state.

8. A non-transitory computer-readable storage medium storing a computer program, wherein the computer program implements the method for adjusting PID control parameters in an anti-shake system as described in claim 1 when executed by a processor.

* * * * *